J. G. TORR.
MECHANISM FOR FACILITATING THE INSTRUCTION OF DRIVERS OF SELF PROPELLED VEHICLES.
APPLICATION FILED MAY 12, 1916.
1,240,629.
Patented Sept. 18, 1917.
2 SHEETS—SHEET 2.
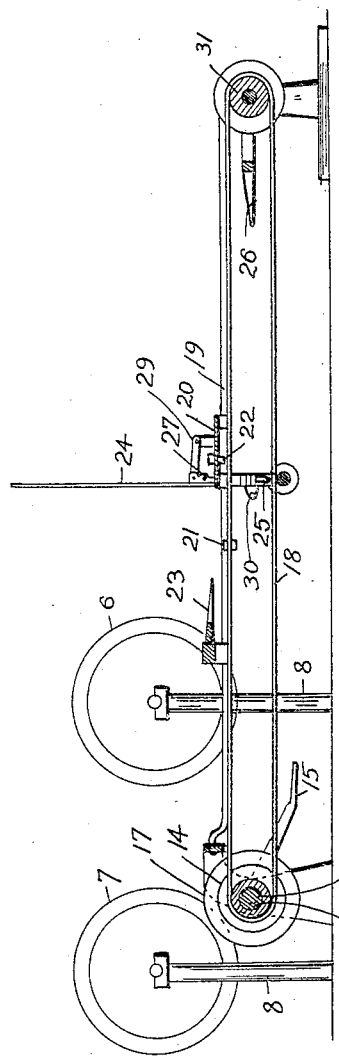
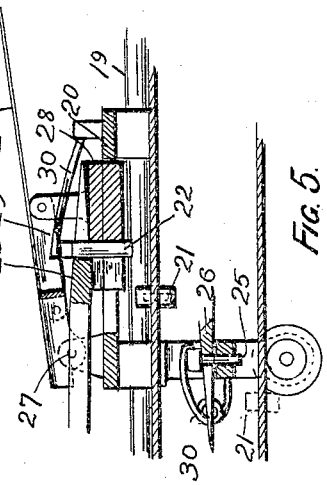
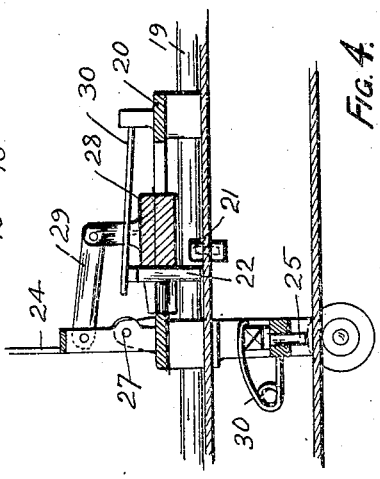
Witnesses:
Inventor
John G. Torr

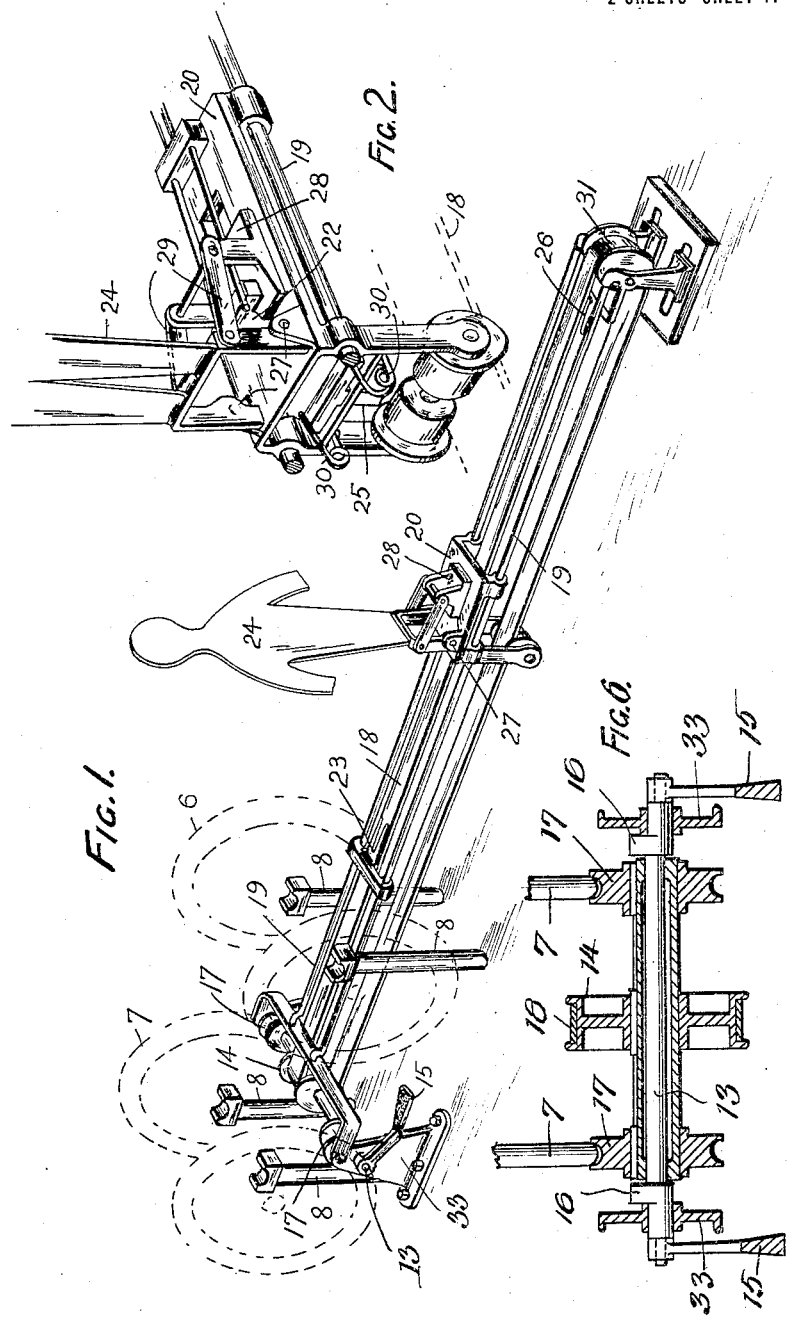

UNITED STATES PATENT OFFICE.

JOHN GEORGE TORR, OF SYDNEY, NEW SOUTH WALES, AUSTRALIA.

MECHANISM FOR FACILITATING THE INSTRUCTION OF DRIVERS OF SELF-PROPELLED VEHICLES.

1,240,629.  Specification of Letters Patent.  Patented Sept. 18, 1917.

Application filed May 12, 1916. Serial No. 97,172.

*To all whom it may concern:*

Be it known that I, JOHN GEORGE TORR, a subject of the King of Great Britain, residing at Sydney, in the State of New South Wales, Commonwealth of Australia, have invented certain new and useful Improvements in Mechanism for Facilitating the Instruction of Drivers of Self-Propelled Vehicles, of which the following is a specification.

This invention has reference to improvements in mechanism for facilitating the instruction of persons desirous of driving self-propelled vehicles more especially motor vehicles, and has been devised with the view to enabling the pupil to acquire some skill and confidence in the art before driving in public thoroughfares.

According to the invention the vehicle is elevated and firmly supported in a stationary position above the ground level by jacks or the like but so that the road wheels may be freely revolved and controlled by suitable brakes. The front or guiding wheels are also free to be turned to one side or the other. Below the vehicle is a pulley or sprocket on which travels an endless conveyer such as a band or chain, the other pulley or sprocket being fixed in position some distance in front. Movable on rails or rods supported parallel to and on either side of the conveyer is a carrier having a danger flap pivoted thereon. This carrier is set in motion and the flap raised from the horizontal to the vertical position by a stud or projection on the conveyer, whenever the instructor operates a lever or other device. The carrier is moved by the conveyer toward the standing vehicle and the driver or pupil by throwing out the clutch and applying the brakes may at the same time bring the conveyer and carrier to rest before the latter reaches the front of the vehicle. Should he fail to do so the carrier is automatically stopped and the flap lowered to the horizontal while the conveyer continues to travel until a stud or projection thereon contacts with the carrier and retracts it to its original outward position.

The driving pulley or sprocket may be actuated from the driving wheels or driving axle or by a separate motor and is controlled by the instructor through a lever or switch but is automatically stopped on the driver stopping the driving wheels.

But in order that the invention may be readily comprehended, reference will now be made to the accompanying sheets of drawings which illustrate the preferred embodiment of the invention.

Figure 1 is a perspective view of the complete mechanism, while,

Fig. 2 is a similar view illustrating the carrier and a portion of the flap which is represented by the figure of a person.

Fig. 3 is a longitudinal sectional elevation, while,

Figs. 4 and 5 are enlarged sectional elevations of the carrier in different positions.

Fig. 6 is a horizontal sectional view of the rear portion of the mechanism, with parts omitted for the sake of clearness.

The same numerals indicate the same or corresponding parts.

6 and 7 represent the front and rear wheels of a vehicle the axles thereof being supported above the ground by means of jacks 8 in such a manner that the driving or rear wheels 7 are free to revolve and the front or steering wheels 6 to be moved laterally on actuating the steering wheel or lever. The shaft 13 having the pulley 14 keyed thereon is provided at its ends with eccentric portions 16, (Fig. 6), which are journaled in suitable brackets or standards 33, either or both of which eccentric portions 16 may have a pedal 15 affixed thereto. The depression of the pedal thus serves to rock the shaft 13 and, due to the eccentric portions 16, to cause it to move nearer the driving wheels 7 thereby permitting the friction wheels 17 also keyed on said shaft to be brought into driving contact with the peripheries of said driving wheels. The effect of operating pedal 15 is, therefore, to rotate the pulley 14 and consequently the endless band 18 around the loose pulley 31. On parallel guide rods 19 suitably supported on each side of the band 18 is a carrier 20 capable of being moved along therewith, when the upper or outer end of a stud or pin 21 fixed to the band 18 and projecting on either side thereof, engages with the stem of a vertical T-bolt 22, Fig. 4 showing the positions assumed by the parts just before such engagement takes place. This stud 21 causes the carrier to be taken along with the band and if the vehicle is not stopped by the pupil, that is to say—if its driving wheels continue to rotate—the carrier is brought up against a fixed fork 23 preferably secured slightly in front of the vehicle. This fork takes under the head of the T-bolt 22, and raises it clear of the stud 21 as shown in Fig. 5 causing at the same time the danger flap 24 to fall to the horizontal position, owing to the pivotal mounting of said flap, as subsequently explained. The fork 23 also acts as a stop to the carrier preventing it being carried under the vehicle.

Should the pupil fail to stop the vehicle and the instructor maintain the friction wheels 17 in contact with the driving wheels 7 by continuing to keep the pedal 15 depressed the band continues to travel until the inner or lower end of the stud 21 engages the stem of a second vertical T-bolt 25, which is likewise carried by the said carrier and is located between the stretches of the band, as shown, so that the engagement of the two parts 21 and 25 will return the carrier to its original or outward position. On reaching this position, the bolt 25 will be engaged by a fork 26, which takes under its head and raises it clear of the stud.

The flap 24 preferably represents the full-sized figure of a person and is mounted upon an inverted U-shaped part, which is hinged at 27 to the carrier, the bolt 22 being mounted to move loosely through a vertical opening in a plate 28, which slides in a slot or opening in the carrier, and is pivoted by arms 29 to the flap. Hence, it follows that when the bolt 22 is engaged by the upper fork 23, the plate 28 will be forced toward the front end of the carrier, as shown in Fig. 5, with the result that the flap is lowered to its horizontal position; while the engagement of the stud 21 with said bolt 22 will force plate 28 in the opposite direction, with the result that the flap is raised into its vertical position. Both bolts 22 and 25 are preferably subjected to downward pressure by springs 30 to maintain them normally in lowered position. The tines of the forks are also formed with a gradually rising curve on their upper sides.

Having thus described my invention what I claim as new and desire to protect by Letters Patent is:—

1. An instruction mechanism for attachment to self-propelled vehicles, comprising an endless conveyer adapted to be driven from the vehicle while the latter is standing, said conveyer extending forwardly from the vehicle and having its stretches arranged one above the other; a track extending forwardly from the vehicle parallel with said conveyer; a carrier arranged to travel along said track toward and from the vehicle; upper and lower bolts movably mounted on said carrier; oppositely-extending projections on said conveyer arranged for alternate engagement with said bolts during the movement of the conveyer, to effect the travel of the carrier; and forks arranged in the respective paths of said bolts, to release the same from such engagement.

2. An instruction mechanism for attachment to self-propelled vehicles, comprising an endless conveyer adapted to be driven from the vehicle while the latter is standing, said conveyer extending forwardly from the vehicle and having its stretches arranged one above the other; a track extending forwardly from the vehicle parallel with said conveyer; a carrier arranged to travel along said track toward and from the vehicle; upper and lower bolts movably mounted on said carrier; oppositely-extending projections on said conveyer arranged for alternate engagement with said bolts during the movement of the conveyer, to effect the travel of the carrier; and means for automatically withdrawing said bolts from such engagement at predetermined intervals.

3. An instruction mechanism for attachment to self-propelled vehicles, comprising an endless conveyer adapted to be driven from the vehicle while the latter is standing, said conveyer extending forwardly from the vehicle and having its stretches arranged one above the other; a track extending forwardly from the vehicle parallel with said conveyer; a carrier arranged to travel along said track toward and from the vehicle; upper and lower bolts movably mounted on said carrier; oppositely-extending projections on said conveyer arranged for alternate engagement with said bolts during the movement of the conveyer, to effect the travel of the carrier; a movable danger flap or signal mounted on said carrier to travel therewith; means for automatically withdrawing said bolts from such engagement at predetermined intervals; and means operable automatically to move said flap to an inoperative position when one of said bolts is withdrawn.

4. An instruction mechanism for attachment to self-propelled vehicles, comprising an endless conveyer adapted to be driven from the vehicle while the latter is standing, said conveyer extending forwardly from the vehicle and having its stretches arranged one above the other; a track extending forwardly from the vehicle parallel with said conveyer; a carrier arranged to travel along said track toward and from the vehicle; upper and lower bolts movably mounted on said carrier; oppositely-extending projections on said conveyer arranged for alternate engagement with said bolts during the movement of the conveyer, to effect the travel of the carrier; a movable danger flap or signal mounted on said carrier to travel therewith, and normally disposed in upright position; means for automatically withdrawing said bolts from such engagement at predetermined intervals; and means operable automatically to lower said flap when the upper bolt is withdrawn.

5. An instruction mechanism for attachment to self-propelled vehicles, comprising an endless conveyer adapted to be driven from the vehicle while the latter is standing, said conveyer extending forwardly from the vehicle and having its stretches arranged one above the other; a track extending forwardly from the vehicle parallel with said conveyer; a carrier arranged to travel along said track toward and from the vehicle; upper and lower bolts movably mounted on said carrier; oppositely-extending projections on said conveyer arranged for alternate engagement with said bolts during the movement of the conveyer, to effect the travel of the carrier; a movable danger flap or signal mounted on said carrier to travel therewith; forks arranged in the respective paths of said bolts, to release the same from such engagement; and means connected to automatically control the movement of said flap in one direction consequent upon the release of one of said bolts.

6. An instruction mechanism for attachment to self-propelled vehicles comprising a traveling element extending forwardly from the vehicle and adapted to be driven from the vehicle while the latter is standing; a track extending forwardly from the vehicle parallel with said traveling element; a carrier movable along said track toward and from the vehicle; means on said carrier engageable with said traveling element, to effect the movement of the carrier; and means for automatically releasing said engaging means at predetermined intervals.

7. An instruction mechanism for attachment to self-propelled vehicles, comprising a traveling element extending forwardly from the vehicle and adapted to be driven from the vehicle while the latter is standing; a track extending forwardly from the vehicle parallel with said traveling element; a carrier movable along said track toward and from the vehicle; means on said carrier engageable with said traveling element, to effect the movement of the carrier; and forks arranged in the path of said engaging means, to automatically withdraw the same from such engagement at predetermined intervals.

8. An instruction mechanism for attachment to self-propelled vehicles, comprising a traveling element extending forwardly from the vehicle and adapted to be driven from the vehicle while the latter is standing; a track extending forwardly from the vehicle parallel with said traveling element; a carrier movable along said track toward the vehicle; means on said carrier engageable with said traveling element to effect such movement of the carrier; and means for automatically releasing said engaging means when the carrier has advanced a predetermined distance.

9. An instruction mechanism for attachment to self-propelled vehicles, comprising a traveling element extending forwardly from the vehicle and adapted to be driven from the vehicle while the latter is standing; a track extending forwardly from the vehicle parallel with said traveling element; a carrier movable along said track toward the vehicle; a bolt movably mounted on said carrier; a projection on said traveling element engageable with said bolt, to effect such movement of the carrier; and means for automatically withdrawing said bolt from such engagement when the carrier has advanced a predetermined distance.

10. An instruction mechanism for attachment to self-propelled vehicles, comprising a traveling element extending forwardly from the vehicle and adapted to be driven from the vehicle while the latter is standing; a track extending forwardly from the vehicle parallel with said traveling element; a carrier movable along said track toward the vehicle; a bolt movably mounted on said carrier; a projection on said traveling element engageable with said bolt, to effect such movement of the carrier; and a fork arranged in the path of said bolt, to engage the same and withdraw it from engagement with said projection when the carrier has advanced a predetermined distance.

11. An instruction mechanism for attachment to self-propelled vehicles, comprising an endless conveyer adapted to be driven from the vehicle while the latter is standing, said conveyer extending forwardly from the vehicle and having its stretches arranged one above the other; a carrier movable parallel with said conveyer to and from the front of the vehicle; bolts movably mounted on said carrier; projections on said conveyer engageable with said bolts to effect the movements of the carrier; an element slidably mounted on said carrier and by which one of said bolts is directly carried; a danger flap or signal pivotally mounted on said carrier, and connected with said sliding element to be controlled thereby; and means for automatically releasing said bolts from such engagement substantially at opposite ends of the conveyer; the release of one of said bolts automatically causing the movement of said flap to inoperative position.

12. An instruction mechanism for attachment to self-propelled vehicles, comprising an endless conveyer adapted to be driven from the vehicle while the latter is standing, said conveyer extending forwardly from the vehicle and having its stretches arranged one above the other; a carrier movable parallel with said conveyer to and from the front of the vehicle; bolts movably mounted on said carrier; projections on said conveyer engageable with said bolts to effect the movements of the carrier; an element slidably mounted on said carrier and by which one of said bolts is directly carried; a danger flap or signal pivotally mounted on said carrier, and connected with said sliding element to be controlled thereby; and means for automatically releasing said bolts from such engagement substantially at opposite ends of the conveyer; said sliding element being automatically moved in one direction, consequent upon the release of one of said bolts, to cause the movement of the flap to inoperative position, and being automatically moved in the other direction by the re-engagement of that bolt with its associated projection, to restore the flap to operative position.

13. An instruction mechanism for attachment to self-propelled vehicles, comprising an endless conveyer adapted to be driven from the vehicle while the latter is standing, said conveyer extending forwardly from the vehicle and having its stretches arranged one above the other; a track extending forwardly from the vehicle parallel with said conveyer; a carrier arranged to travel along said track toward and from the vehicle; upper and lower bolts movably mounted on said carrier; oppositely-extending projections on said conveyer arranged for alternate engagement with said bolts during the movement of the conveyer, to effect the travel of the carrier; a movable danger flap or signal mounted on said carrier to travel therewith; means for automatically withdrawing said bolts from such engagement substantially at opposite ends of the conveyer; and means operable automatically to move said flap into inoperative position consequent upon the release of one of said bolts; and to restore it to operative position consequent upon the re-engagement of that bolt with its associated projection.

14. An instruction mechanism for attachment to self-propelled vehicles, comprising an endless conveyer adapted to be driven from the vehicle while the latter is standing, said conveyer extending forwardly from the vehicle and having its stretches arranged one above the other; a track extending forwardly from the vehicle parallel with said conveyer; a carrier arranged to travel along said track toward and from the vehicle; upper and lower bolts movably mounted on said carrier; oppositely-extending projections on said conveyer arranged for alternate engagement with said bolts during the movement of the conveyer, to effect the travel of the carrier; a movable danger flap or signal mounted on said carrier to travel therewith, and normally disposed in upright position; means for automatically withdrawing said bolts from such engagement at predetermined intervals; and means operable automatically to lower said flap when the upper bolt is withdrawn, and to restore it to upright position when said upper bolt is re-engaged with its associated projection.

In testimony whereof I have hereunto set my hand.

JOHN GEORGE TORR.

Witnesses:
CHARLES E. GRAHAM,
HENRY W. CLARKE.

Copies of this patent may be obtained for five cents each, by addressing the "Commissioner of Patents, Washington, D. C."